(12) United States Patent
Moon et al.

(10) Patent No.: US 11,522,675 B2
(45) Date of Patent: Dec. 6, 2022

(54) APPARATUS AND METHOD FOR ENCRYPTION AND DECRYPTION BASED ON TWEAK CONVERTER TO WHICH KEY TABLE IS APPLIED

(71) Applicants: SAMSUNG SDS CO., LTD., Seoul (KR); Korea Advanced Institute of Science and Technology, Daejeon (KR)

(72) Inventors: Duk-Jae Moon, Seoul (KR); Ji-hoon Kwon, Seoul (KR); Joo-Young Lee, Seoul (KR)

(73) Assignees: SAMSUNG SDS CO., LTD., Seoul (KR); Korea Advanced Institute of Science and Technology, Daejeon (KR)

( * ) Notice: Subject to any disclaimer, the term of this patent is extended or adjusted under 35 U.S.C. 154(b) by 351 days.

(21) Appl. No.: 16/664,836

(22) Filed: Oct. 26, 2019

(65) Prior Publication Data
US 2021/0126770 A1    Apr. 29, 2021

(30) Foreign Application Priority Data
Oct. 24, 2019    (KR) .................. 10-2019-0132656

(51) Int. Cl.
*H04L 9/06* (2006.01)
*H04L 9/08* (2006.01)
*G09C 1/00* (2006.01)

(52) U.S. Cl.
CPC .............. *H04L 9/0631* (2013.01); *G09C 1/00* (2013.01); *H04L 9/0869* (2013.01)

(58) Field of Classification Search
None
See application file for complete search history.

(56) References Cited

U.S. PATENT DOCUMENTS

| | | | | |
|---|---|---|---|---|
| 5,623,548 | A | * | 4/1997 | Akiyama .............. H04L 9/0662 380/28 |
| 2015/0244518 | A1 | | 8/2015 | Koo et al. |
| 2015/0349950 | A1 | * | 12/2015 | Shrimpton ............ H04L 9/0625 713/189 |
| 2017/0126395 | A1 | * | 5/2017 | Moon .................... H04L 9/0618 |
| 2018/0074975 | A1 | * | 3/2018 | Deutsch .................. G06F 3/065 |

* cited by examiner

*Primary Examiner* — William J. Goodchild
(74) *Attorney, Agent, or Firm* — The PL Law Group, PLLC

(57) ABSTRACT

A method according to one embodiment includes generating one or more key tables based on a first seed value; generating one or more secret values from a tweak value based on the one or more key tables; and performing encryption or decryption using the one or more secret values. An apparatus according to one embodiment includes a key table generator configured to generate one or more key tables based on a first seed value, a secret value generator configured to generate one or more secret values from a tweak value based on the one or more key tables, and an encryptor/decryptor configured to perform encryption or decryption using the one or more secret values.

14 Claims, 9 Drawing Sheets

APPARATUS AND METHOD FOR ENCRYPTION AND DECRYPTION BASED ON TWEAK CONVERTER TO WHICH KEY TABLE IS APPLIED

CROSS REFERENCE TO RELATED APPLICATIONS AND CLAIM OF PRIORITY

This application claims the benefit of Korean Patent Application No. 10-2019-0132656 filed on Oct. 24, 2019 in the Korean Intellectual Property Office, the disclosure of which is incorporated herein by reference in its entirety.

TECHNICAL FIELD

The following description relates to cryptographic technology.

BACKGROUND ART

Existing encryption algorithms for tweakable block cipher are algorithms designed based on security in a black box environment, and do not provide security in a white box environment.

SUMMARY

The disclosed embodiments are intended to provide an apparatus and method for encryption and decryption.

In one general aspect, there is provided a method including generating one or more key tables based on a first seed value; generating one or more secret values from a tweak value based on the one or more key tables; and performing encryption or decryption using the one or more secret values.

The performing of the encryption or the decryption may include performing the encryption or the decryption using a first operation based on input data and a first secret value among the one or more secret values, a permutation function based on a result value of the first operation, and a second operation based on a result value of the permutation function and the first secret value or a second secret value among the one or more secret values.

The first operation may be an exclusive OR (XOR) operation between the first secret value and the input data and the second operation may be an XOR operation between the first secret value or the second secret value and the result value of the permutation function.

The permutation function may be a non-cryptographic key-based permutation function.

The permutation function may be a cryptographic key-based permutation function.

The method may further include generating one or more key tables based on a second seed value; and generating a third secret value from the tweak value based on one or more key tables generated based on the second seed value, wherein the performing of the encryption or the decryption uses the third secret value as a cryptographic key of the cryptographic key-based permutation function.

The generating of the one or more key tables may include determining a size of the one or more key tables based on security strength for the encryption or the decryption and a size of the tweak value and generating the one or more key tables based on the determined size.

In another general aspect, there is provided an apparatus including a key table generator configured to generate one or more key tables based on a first seed value; a secret value generator configured to generate one or more secret values from a tweak value based on the one or more key tables; and an encryptor/decryptor configured to perform encryption or decryption using the one or more secret values.

The encryptor/decryptor may perform the encryption or the decryption using a first operation based on input data and a first secret value among the one or more secret values, a permutation function based on a result value of the first operation, and a second operation based on a result value of the permutation function and the first secret value or a second secret value among the one or more secret values.

The first operation may be an XOR operation between the first secret value and the input data and the second operation may be an XOR operation between the first secret value or the second secret value and the result value of the permutation function.

The permutation function may be a non-cryptographic key-based permutation function.

The permutation function may be a cryptographic key-based permutation function.

The key generator may further generate one or more key tables based on a second seed value, the secret value generator may further generate a third secret value from the tweak value based on the one or more key tables generated based on the second seed value, and the encryptor/decryptor may use the third secret value as a cryptographic key of the cryptographic key-based permutation function.

The key table generator may determine a size of the one or more key tables based on security strength for the encryption or the decryption and a size of the tweak value and generate the one or more key tables based on the determined size.

According to the embodiments of the present disclosure, an encryption/decryption structure secure in a black box environment is used intact without modification of internal logic or structure and a key table generated from a seed value is used to generate a secret value used for encryption and decryption from a tweak value, so that sufficient security is provided in a white box environment and at the same time an algorithm suitable for an environment to which encryption and decryption are applied can be implemented.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
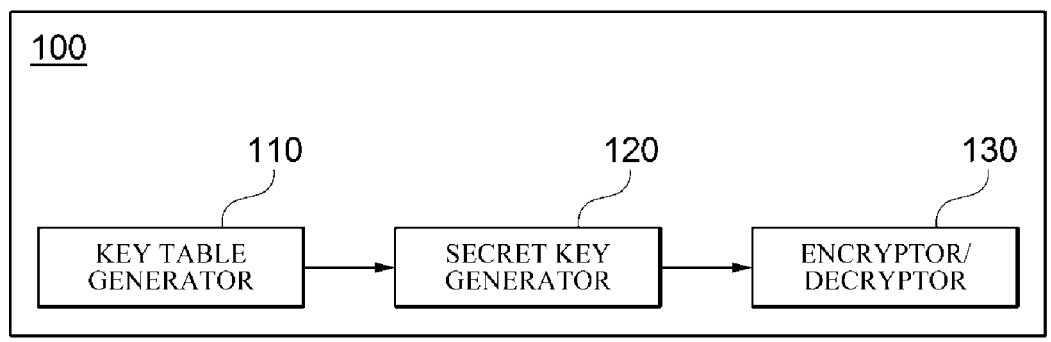
FIG. 1 is a diagram illustrating a configuration of an apparatus for encryption and decryption.

FIG. 1 is a diagram illustrating a configuration of an apparatus for encryption and decryption.

Referring to FIG. 1, the apparatus 100 for encryption and decryption includes a key table generator 110, a secret value generator 120, and an encryptor/decryptor 130.

The key table generator 110 generates one or more key tables on the basis of a seed value.

In one embodiment, a seed value may be, for example, an arbitrary random number, a cryptographic key, a counter value or an initialization vector used in operation mode of block cipher, etc.

A key table refers to a lookup table including a plurality of random bit strings derived from the seed value and index bit strings each corresponding to each of the plurality of random bit strings.

According to one embodiment, the key table generator 110 may be generated using a random number generator which generates a random bit string using the seed value as an input value. However, according to an embodiment, in addition to the random number generator, the key table generator 110 may be generated using various methods that generate a random value from the seed value and has a one-way characteristic which makes it challenging to infer the seed value using the generated value.

According to one embodiment, the key table generator 110 may determine a size of the key table on the basis of security strength for encryption or decryption and a tweak value used for encryption or decryption, and may generate one or more key tables from the seed value on the basis of the determined size.

Also, according to one embodiment, the key table generator 110 may use each of one or more seed values and generate one or more key tables from each seed value. For example, the key table generator 110 may generate one or more key tables using a first seed value and generate one or more key tables using a second seed value.

The secret value generator 120 generates one or more secret values from the tweak value on the basis of the one or more key tables generated by the key table generator 110.

According to one embodiment, the secret value generator 120 may generate one or more tweak converters to which the one or more key tables generated by the key table generator 110 are applied and may generate one or more secret values using each of the generated tweak converters.

Figure 2:
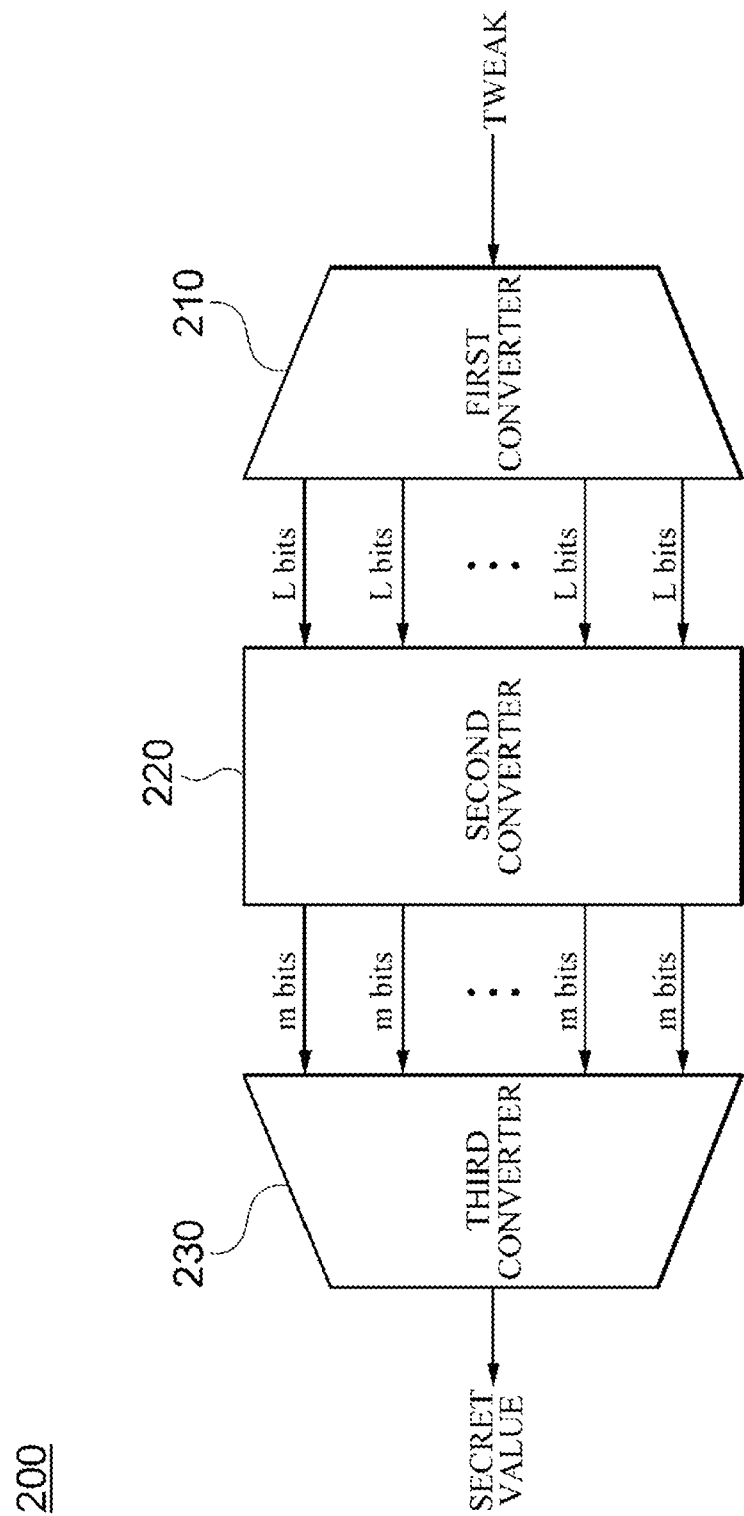
FIG. 2 is a diagram illustrating one example of a teak converter according to one embodiment.

Specifically, FIG. 2 is a diagram illustrating one example of a teak converter according to one embodiment.

Referring to FIG. 2, the tweak converter 200 may include a first converter 210, a second converter 220, and a third converter 230.

The first converter 210 may receive a tweak value and generate a first random bit string having a length extending beyond a length of the tweak value.

Specifically, the first converter 210 may generate the first random bit string from the tweak value using a first conversion function, for example, an advanced encryption standard (AES) algorithm, hash function, or the like. In this case, in addition to the aforementioned examples, the first converter 210 may use various known functions capable of converting an input value into a random bit string having a specific length as the first conversion function.

On the other hand, a length of a first random bit string generated by the first converter 210 may be determined according to a length of each of the index bit strings included in a key table applied to the second converter 220 and the predetermined number of times of referencing a key table. For example, when the length of the index bit string of the key table is L bits and the number of times of referencing the key table is set to d, the length of the first random bit string may be L×d bits. Meanwhile, the number of times of referencing the key table may be set by the user in consideration of security strength.

The first converter 210 may divide the generated first random bit string into d bit strings in units of L bits and output the divided bit strings, and the second converter 220 may convert each of the d bit strings each having a length of L bits into d bit strings each having a length of m bits (where m is a length of each of the random bit strings included in the key table) by referencing the key table.

In more detail, the second converter 220 may compare each of the d bit strings each having a length of L bits, which are output from the first converter 210, with an index bit string of the key table and output a bit string having the same index bit string as each of the d bit strings from among a plurality of random bit strings included in the key table.

The third converter 230 may convert the d bit strings each having a length of m bits, which are output by the second converter 220, into a secret value.

Specifically, the third converter 230 may concatenate he d bit strings each having a length of m bits, which are output from the second converter 220, to generate a bit string having a length of m×d bits and may convert the generated bit string having a length of m×d bits into a secret value using a second conversion function.

In this case, the third converter 230 may generate the secret value from the bit string having a length of m×d bits using the second conversion function, for example, an AES algorithm, hash function, or the like. However, in addition to the aforementioned examples, the third converter 230 may use various known functions capable of converting an input value into a random bit string having a specific length as the second conversion function.

Figure 3:
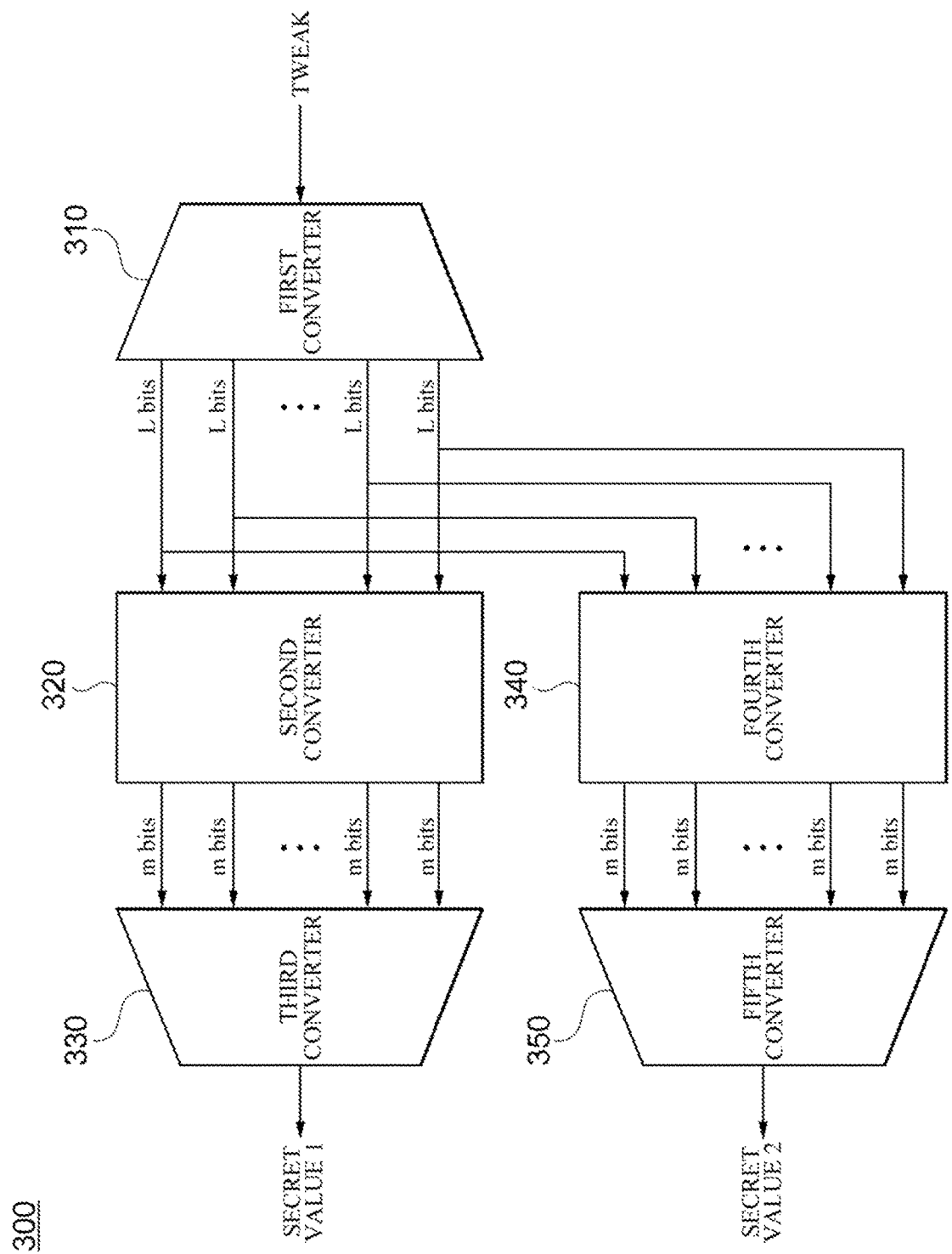
FIG. 3 is a diagram illustrating another example of a tweak converter according to one embodiment.

FIG. 3 is a diagram illustrating another example of a tweak converter according to one embodiment.

Referring to FIG. 3, a tweak converter 300 according to one embodiment may include a first converter 310, a second converter 320, a third converter 330, a fourth converter 340, and a fifth converter 350.

In the example shown in FIG. 3, the first converter 310, the second converter 320, and the third converter 330 are respectively substantially the same as the first converter 210, the second converter 220, and the third converter 230, which are illustrated in FIG. 2, and thus redundant descriptions thereof will be omitted.

The fourth converter 320 may convert d bit strings each having a length of L bits, which are output by the first converter 310, into d bit strings each having a length of m bits by referencing a key table that is different from the key table referenced by the second converter 320. In this case, the key table referenced by the fourth converter 340 may be generated by the key table generator 110 using the same seed value as the seed value used for generating a key table referenced by the third converter 330.

The fifth converter 350 may convert the d bit strings each having a length of m bits, which are output by the fourth converter 340, into secret value 2 that differs from secret value 1 generated by the third converter 330.

In more detail, the fifth converter 350 may concatenate the d bit strings each having a length of m bits, which are output by the fourth converter 340, to generate a bit string having a length of m×d bits, and may convert the generated bit string having a length of m×d bits into a secret value using a third conversion function.

In this case, the fifth converter 350 may use the same conversion function as the second conversion function used by the third converter 330 as the third conversion function, but is not necessarily limited thereto, and various known functions capable of converting an input value in a random bit string having a specific length may be used as the third conversion function.

Figure 4:
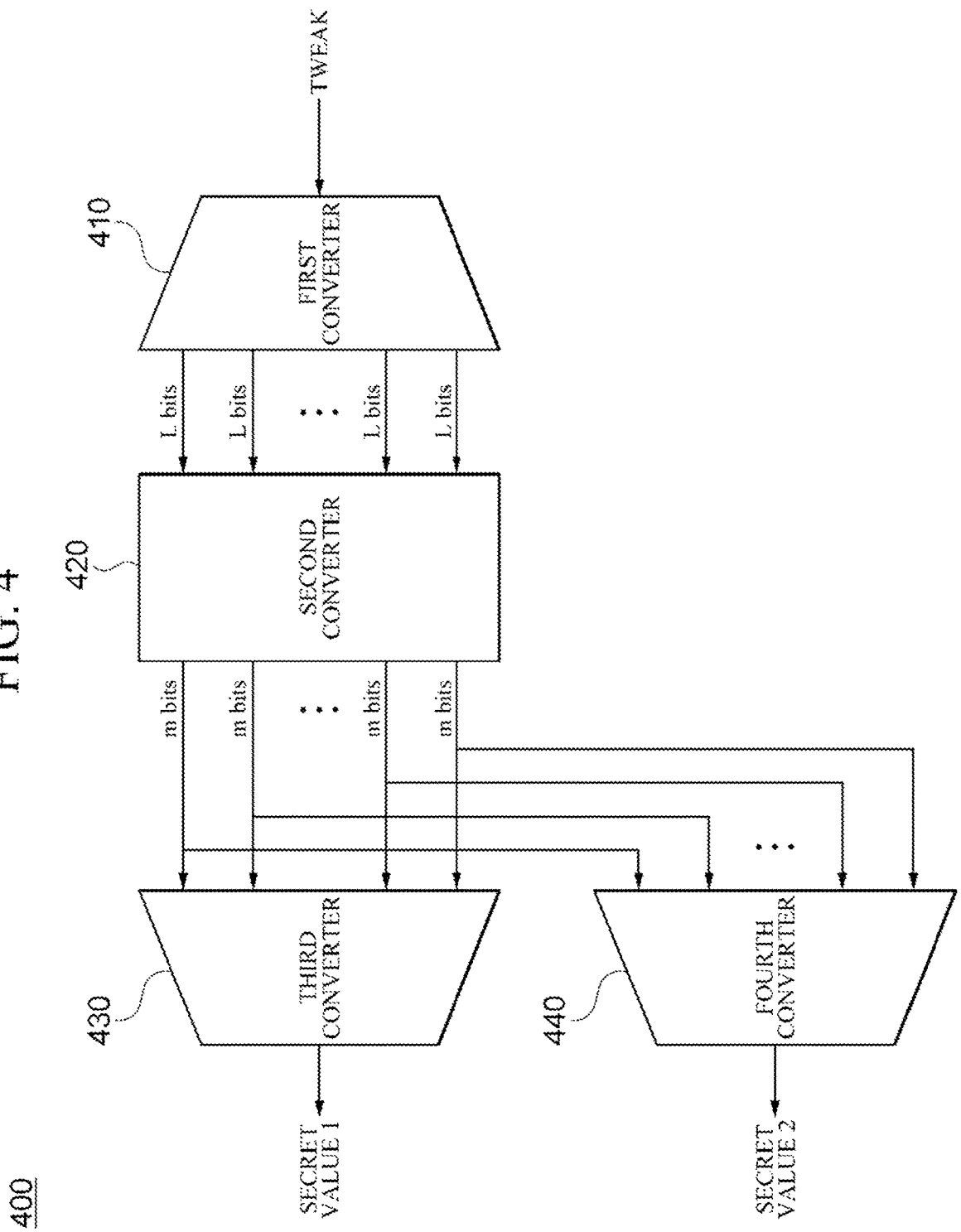
FIG. 4 is a diagram illustrating still another example of a tweak converter according to one embodiment.

FIG. 4 is a diagram illustrating still another example of a tweak converter according to one embodiment.

Referring to FIG. 4, a tweak converter 400 according to one embodiment may include a first converter 410, a second converter 420, a third convert 430, and a fourth converter 440.

In the example illustrated in FIG. 4, the first converter 410, the second converter 420, and the third converter 430 are respectively substantially the same as the first converter 210, the second converter 220, and the third converter 230, which are illustrated in FIG. 2, and thus redundant descriptions thereof will be omitted.

The fourth converter 440 may convert d bit strings each having a length of m bits, which are output from the second converter 420, into secret value 2 that differs from secret value 1 generated by the third converter 430.

Specifically, the fourth converter 440 may concatenate d bit strings each having a length of m bits, which are output from the second converter 420, to form a bit string having a length of m×d bits, and may convert the generated bit string having a length of m×d bits into the secret value using a conversion function that is different from a second conversion function used by the third converter 430.

In this case, the conversion function used by the fourth converter 440 may be, for example, an AES algorithm, hash function, or the like, and the conversion function is not necessarily limited to a specific function as long as it can convert an input value into a random bit string having a specific length.

Referring back to FIG. 1, the encryptor/decryptor 130 may perform encryption or decryption using one or more secret values generated by the secret value generator 120.

According to one embodiment, the encryptor/decryptor 130 may receive input data to be encrypted or decrypted and the one or more secret values generated by the secret value generator 120 and perform encryption or decryption for the input data.

Figure 5:
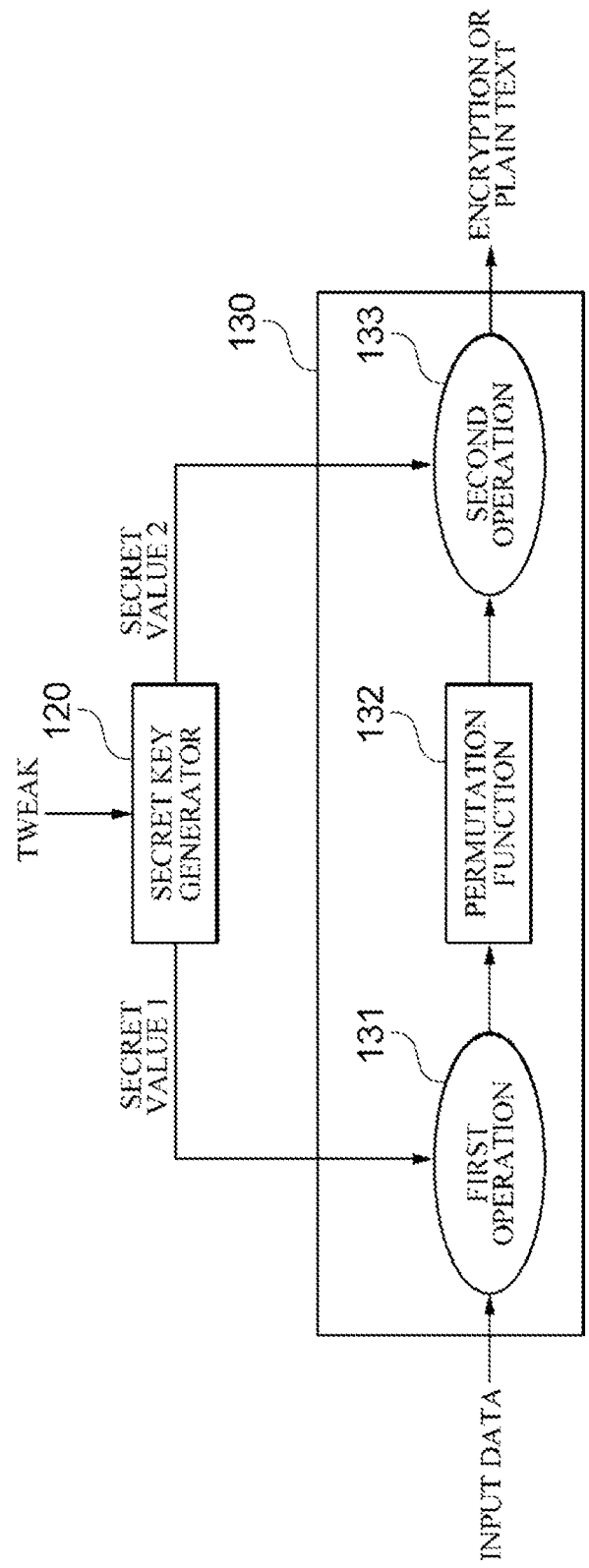
FIG. 5 is diagram illustrating an example of an encryption/decryption structure according to one embodiment.

Specifically, FIG. 5 is a diagram illustrating an example of an encryption/decryption structure according to one embodiment.

Referring to FIG. 5, the encryptor/decryptor 130 may perform encryption or decryption for input data using a first operation 131 based on the input data and secret value 1 generated by the secret value generator 120, a permutation function based on a result value of the first operation 131, and a second operation 133 based on secret value 2 generated by the secret value generator 120 and a result value of the permutation function 132.

In this case, according to one embodiment, the first operation 131 may be an exclusive OR (XOR) operation between the secret value 1 and the input data, and the second operation 133 may be an XOR operation between the result value of the permutation function 132 and the secret value 2. However, in addition to an XOR operation, various logical operations or arithmetical operations may be used for the first operation 131 and the second operation 133.

The secret value 1 and the secret value 2, which are input for the first operation 131 and the second operation 133, respectively, may be identical or different values. Specifically, the secret value generator 120 may generate one secret value from a tweak value using, for example, the tweak converter 200 to which a key table generated from the first seed value is applied as shown in the example illustrated in FIG. 2. The encryptor/decryptor 130 may use the generated secret value as the first secret value 1 and the secret value 2.

In another example, the secret value generator 120 may generate two different secret values from the tweak value using two tweak converters which have the same structure as the tweak converter 200 shown in FIG. 2 but to each of which a different key table generated from the first seed value is applied. In this case, the encryptor/decryptor 130 may use one of the two generated secret value as the secret value 1 and the other as the secret value 2.

In still another example, the secret value generator 120 may generate two different secret values from a tweak value using, for example, the tweak converter 300 or 400 illustrated in FIG. 3 or 4, and the encryptor/decryptor 130 may use one of the two generated secret values as the secret value 1 and the other as the secret value 2.

According to one embodiment, the permutation function 132 may be a non-cryptographic key-based permutation function, such as hash function, which does not require a separate cryptographic key as an input value, or a cryptographic key-based permutation function, such as a block cipher algorithm (e.g., an AES algorithm), which requires a separate cryptographic key as an input value. However, the permutation function 132 may be a known permutation function of various forms having a one-way characteristic in addition to the above-mentioned examples.

Figure 6:
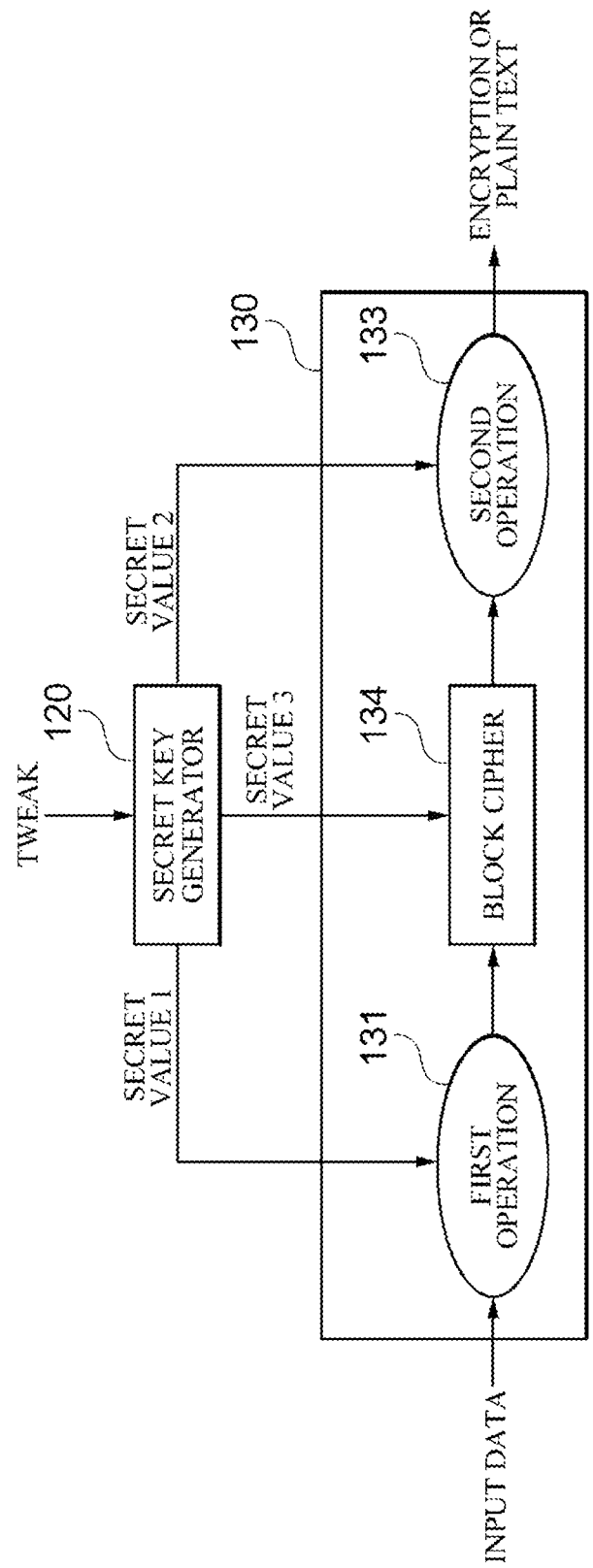
FIG. 6 is a diagram illustrating another example of an encryption/decryption structure according to one embodiment.

FIG. 6 is a diagram illustrating another example of an encryption/decryption structure according to one embodiment.

In a case where a cryptographic key-based permutation function, such as a block cipher algorithm 134, is used as a permutation function as shown in the example illustrated in FIG. 6, the encryptor/decryptor 130 may use an additional secret value (i.e., secret value 3) generated by the secret value generator 120 as a cryptographic key of the block cipher algorithm 134.

In this case, according to one embodiment, the secret value generator 120 may generate a third secret value from a tweak value using a tweak converter which has the same structure as the tweak converter 200 shown in FIG. 2 and to which a key table generated from the second seed value that is different from the above-described first seed value is applied.

Figure 7:
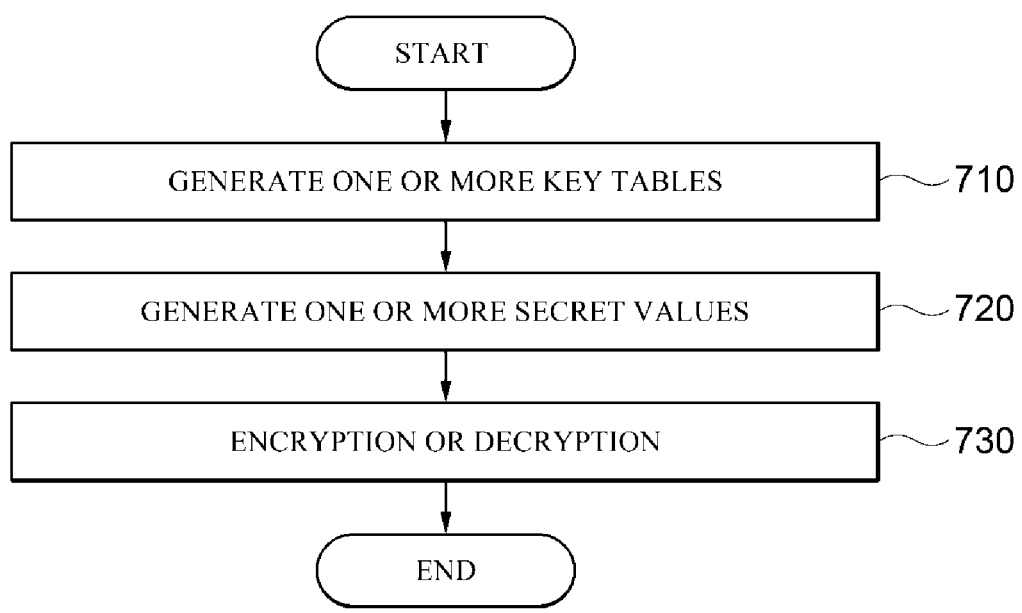
FIG. 7 is a flowchart illustrating a method of encryption and decryption according to one embodiment.

FIG. 7 is a flowchart illustrating a method of encryption and decryption according to one embodiment.

The method shown in FIG. 7 may be performed by, for example, the apparatus 100 for encryption and decryption shown in FIG. 1.

Referring to FIG. 7, the apparatus 100 for encryption and decryption generates one or more key tables based on a seed value (710).

In this case, according to one embodiment, the apparatus 100 for encryption and decryption may generate one key table or a plurality of different key tables on the basis of the seed value.

Then, the apparatus 100 for encryption and decryption generates one or more secret values from a tweak value on the basis of the one or more generated key tables (720).

In this case, according to one embodiment, the apparatus 100 for encryption and decryption may generate one secret value or a plurality of different secret values using one or more tweak converters to which the one or more generated key tables are applied.

Thereafter, the apparatus 100 for encryption and decryption performs encryption or decryption using the one or more generated secret values (730).

In this case, according to one embodiment, the apparatus 100 for encryption and decryption may perform encryption or decryption for input data using a first operation based on the input data and a first secret value among the one or more secret values, a permutation function based on a result value of the first operation, and a second operation based on the first secret value and a result value of the permutation function.

According to another embodiment, the apparatus 100 for encryption and decryption may perform encryption or decryption for input data using a first operation based on the input data and a first secret value among the one or more secret values, a permutation function based on a result value of the first operation, and a second operation based on a second secret value among the one or more secret values and a result value of the permutation function.

In FIG. 7, at least some of the operations may be performed in different order or may be combined into fewer operations or further divided into more operations. In addition, some of the operations may be omitted, or one or more extra operations, which are not illustrated, may be added to the flowchart and be performed.

Figure 8:
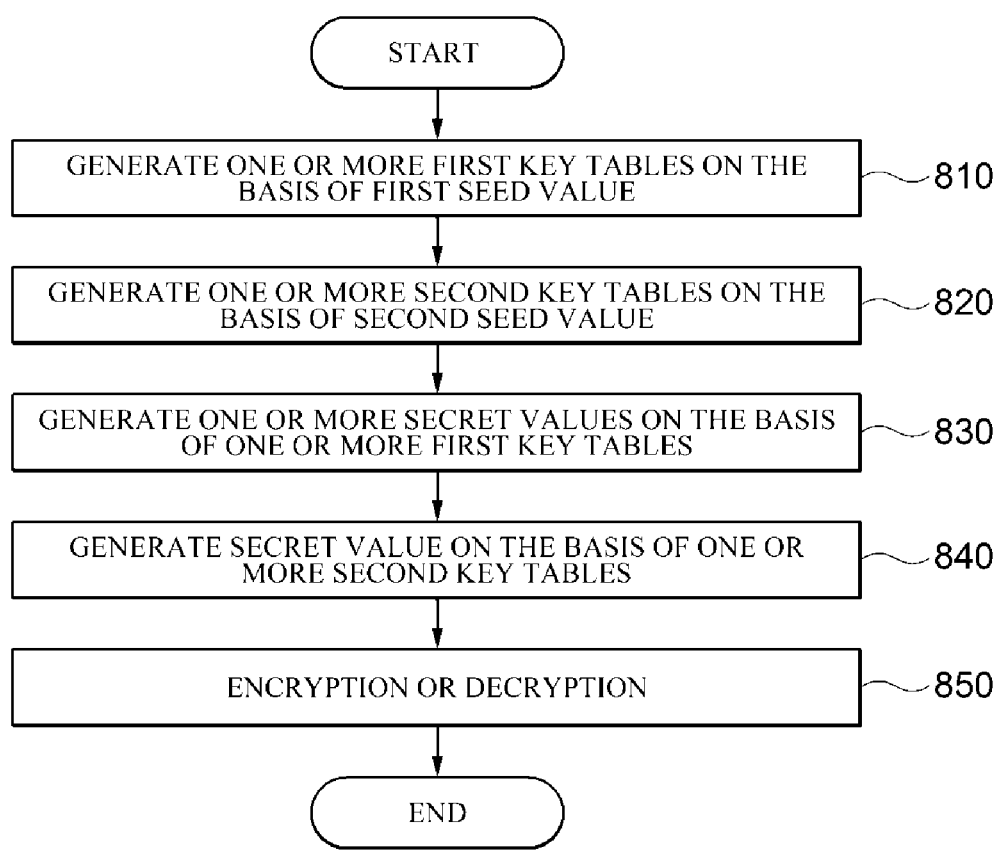
FIG. 8 is a flowchart illustrating a method of encryption and decryption according to another embodiment.

FIG. 8 is a flowchart illustrating a method of encryption and decryption according to another embodiment.

The method shown in FIG. 8 may be performed by, for example, the apparatus 100 for encryption and decryption shown in FIG. 1.

Referring to FIG. 8, the apparatus 100 for encryption and decryption generates one or more first key tables on the basis of a first seed value (810).

In this case, according to one embodiment, the apparatus 100 for encryption and decryption may generate one first key table or a plurality of different first key tables on the basis of the first seed value.

Then, the apparatus 100 for encryption and decryption generates one or more second key tables on the basis of a second seed value (820).

In this case, according to one embodiment, the apparatus 100 for encryption and decryption may generate one second key table or a plurality of different second key tables on the basis of the second seed value.

Then, the apparatus 100 for encryption and decryption generates one or more secret values from a tweak value on the basis of the one or more first key tables (830).

In this case, according to one embodiment, the apparatus 100 for encryption and decryption may generate one secret value or a plurality of different secret values using one or more tweak converters to which the one or more generated first key tables are applied.

Then, the apparatus 100 for encryption and decryption generates a secret value from the tweak value on the basis of one or more second key tables (840).

In this case, according to one embodiment, the apparatus 100 for encryption and decryption may generate the secret value using a tweak converter to which the one or more second key tables are applied.

Then, the apparatus 100 for encryption and decryption performs encryption or decryption using the one or more secret values generated based on the one or more first key tables and the secret value generated based on the one or more second key tables (850).

In this case, according to one embodiment, the apparatus 100 for encryption and decryption may perform encryption or decryption for input data using a first operation based on the input data and a first secret value among the one or more secret values generated based on the one or more first key tables, a permutation function based on a result value of the first operation, and a second operation based on a result value of the permutation function and the first secret value or a second secret value among the one or more secret values generated based on the one or more first key tables. The permutation function may be a cryptographic key-based permutation function, and in this case, the apparatus 100 for encryption and decryption may use a third secret value generated based on the one or more second key tables as a cryptographic key of the cryptographic key-based permutation function.

In FIG. 8, at least some of the operations may be performed in different order or may be combined into fewer operations or further divided into more operations. In addition, some of the operations may be omitted, or one or more extra operations, which are not illustrated, may be added to the flowchart and be performed.

Figure 9:
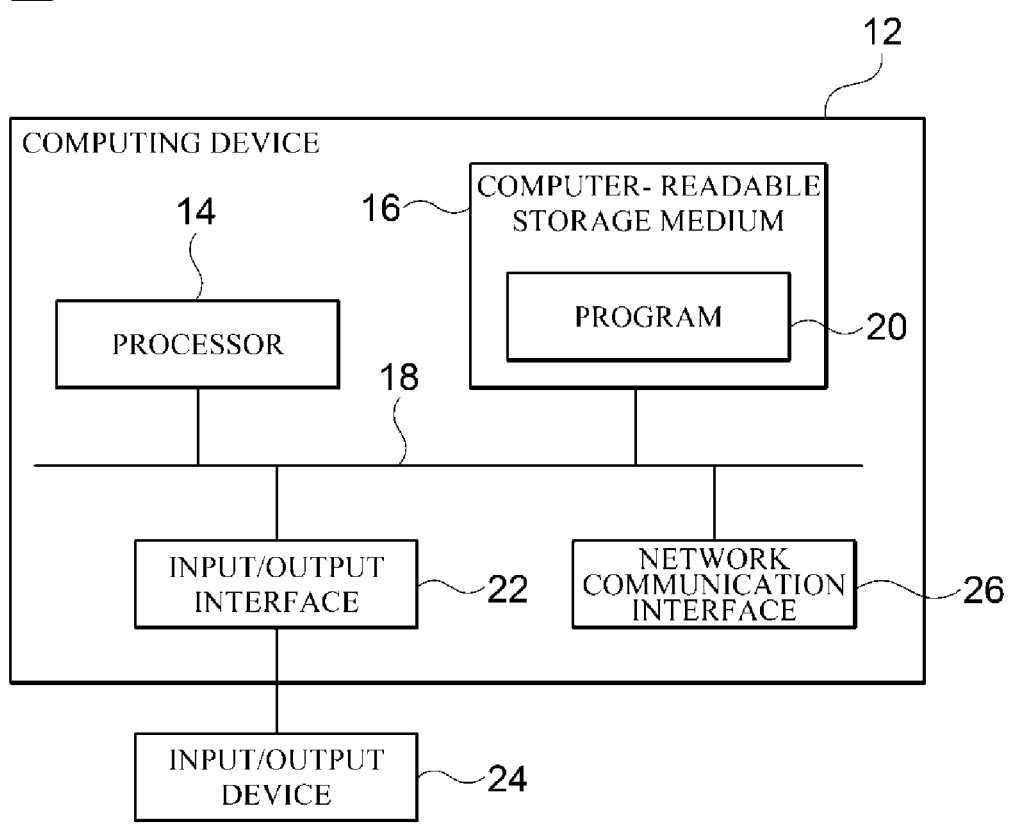
FIG. 9 is a block diagram for describing a computing environment including a computing device suitable to be used in exemplary embodiments.

FIG. 9 is a block diagram for describing a computing environment 10 including a computing device suitable to be used in exemplary embodiments. In the illustrated embodiments, each of the components may have functions and capabilities different from those described hereinafter and additional components may be included in addition to the components described herein.

The illustrated computing environment 10 includes a computing device 12. In one embodiment, the computing device 12 may be one or more components included in the apparatus for encryption and decryption according to the embodiments of the present disclosure. The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to an exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method which is performed by a computing device comprising one or more processors and a memory in which one or more programs to be executed by the one or more processors are stored, the method comprising:

generating, by the one or more processors, one or more key tables based on a first seed value;

generating, by the one or more processors, one or more secret values from a tweak value based on one or more tweak converters to which the one or more key tables are applied; and performing, by the one or more processors, the encryption or the decryption using the one or more secret values, wherein the generating of the one or more secret values comprises generating a first bit string from the tweak value using a first conversion function, generating a second bit string from the first bit string using the one or more key tables, and generating the one or more secret values from the second bit string using a second conversion function.

2. The method of claim 1, wherein the performing of the encryption or the decryption comprises performing the encryption or the decryption using a first operation based on input data and a first secret value among the one or more secret values, a permutation function based on a result value of the first operation, and a second operation based on a result value of the permutation function and the first secret value or a second secret value among the one or more secret values.

3. The method of claim 2, wherein the first operation is an exclusive OR (XOR) operation between the first secret value and the input data and the second operation is an XOR operation between the first secret value or the second secret value and the result value of the permutation function.

4. The method of claim 2, wherein the permutation function is a non-cryptographic key-based permutation function.

5. The method of claim 2, wherein the permutation function is a cryptographic key-based permutation function.

6. The method of claim 5, further comprising:

generating, by the one or more processors, one or more key tables based on a second seed value; and generating, by the one or more processors, a third secret value from the tweak value based on the one or more key tables generated based on the second seed value, wherein the performing of the encryption or the decryption uses the third secret value as a cryptographic key of the cryptographic key-based permutation function.

7. The method of claim 1, wherein the generating of the one or more key tables comprises:

determining a size of the one or more key tables based on security strength for the encryption or the decryption and a size of the tweak value; and generating the one or more key tables based on the determined size.

8. An apparatus comprising:

one or more processors; and a memory storing one or more programs, wherein the one or more processors are configured to execute the one or more programs to:

generate one or more key tables based on a first seed value;

generate one or more secret values from a tweak value based on one or more tweak converters to which the one or more key tables are applied; and perform encryption or decryption using the one or more secret values, wherein the one or more processors are further configured to execute the one or more programs to generate a first bit string from the tweak value using a first conversion function, generate a second bit string from the first bit string using the one or more key tables, and generate the one or more secret values from the second bit string using a second conversion function.

9. The apparatus of claim 8, wherein the one or more processors are further configured to execute the one or more programs to perform the encryption or the decryption using a first operation based on input data and a first secret value among the one or more secret values, a permutation function based on a result value of the first operation, and a second operation based on a result value of the permutation function and the first secret value or a second secret value among the one or more secret values.

10. The apparatus of claim 9, wherein the first operation is an exclusive OR (XOR) operation between the first secret value and the input data and the second operation is an XOR operation between the first secret value or the second secret value and the result value of the permutation function.

11. The apparatus of claim 9, wherein the permutation function is a non-cryptographic key-based permutation function.

12. The apparatus of claim 9, wherein the permutation function is a cryptographic key-based permutation function.

13. The apparatus of claim 12, wherein the one or more processors are further configured to execute the one or more programs to:
- generate one or more key tables based on a second seed value,
- generate a third secret value from the tweak value based on the one or more key tables generated based on the second seed value, and
- use the third secret value as a cryptographic key of the cryptographic key-based permutation function.

14. The apparatus of claim 8, wherein the one or more processors are further configured to execute the one or more programs to:
- determine a size of the one or more key tables based on security strength for the encryption or the decryption and a size of the tweak value; and
- generate the one or more key tables based on the determined size.

* * * * *